United States Patent [19]
Root et al.

[11] 3,825,965
[45] July 30, 1974

[54] APPARATUS FOR CLEANING TIRE INNER-LINERS

[75] Inventors: Glenn M. Root, Snyder; Ronald G. Root, Glenwood; Alvin L. Parenti, Buffalo; Arthur J. Sullivan, Staten Island, all of N.Y.

[73] Assignee: Esso Research and Engineering Company, Linden, N.J.

[22] Filed: Apr. 9, 1973

[21] Appl. No.: 349,394

[52] U.S. Cl. ............... 15/21 D, 51/5, 118/50, 118/73, 118/318
[51] Int. Cl. ............................... A46b 13/04
[58] Field of Search ...... 15/21 R, 21 B, 21 C, 21 D, 15/21 E, 97; 51/5; 118/50, 73, 318; 157/13; 425/28

[56] References Cited
UNITED STATES PATENTS
2,986,849  6/1961  Clark ........................ 15/21 R X
3,692,444  9/1972  Huggar et al. .................. 425/28

Primary Examiner—Edward L. Roberts
Attorney, Agent, or Firm—Harold N. Wells

[57] ABSTRACT

An apparatus for cleaning the interior of tubeless tires employs a combination of solvent and brushing action, applied while the inflated tire is being rotated. The tire is rotated and cleaned for a predetermined period of time sufficient to remove residual mold release agents and other contaminants, thus preparing the tire interior for the subsequent application of a liquid air barrier coating or another treating requiring a clean interior surface. After cleaning, the solvent is forced out by the air pressure within the tire through a solvent removal system, following which the casing is rinsed by clean solvent prior to deflation and removal of the tire from the apparatus.

10 Claims, 11 Drawing Figures

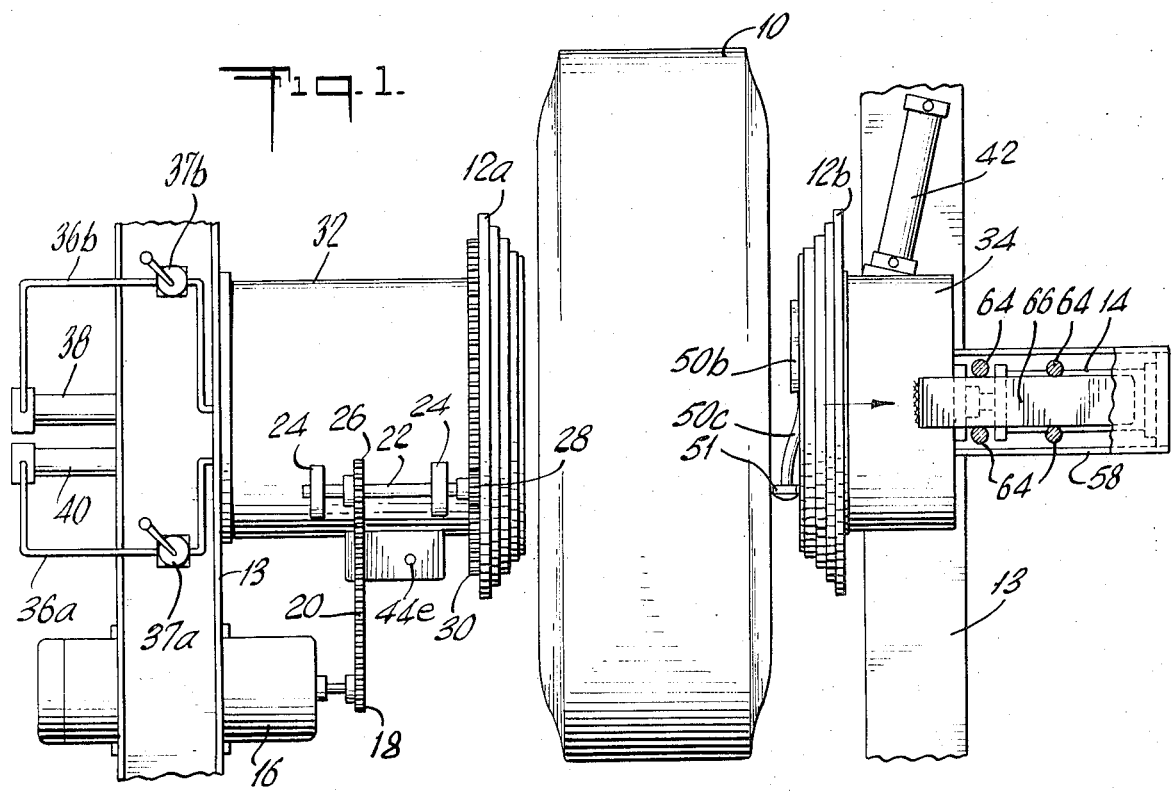
Fig. 1.
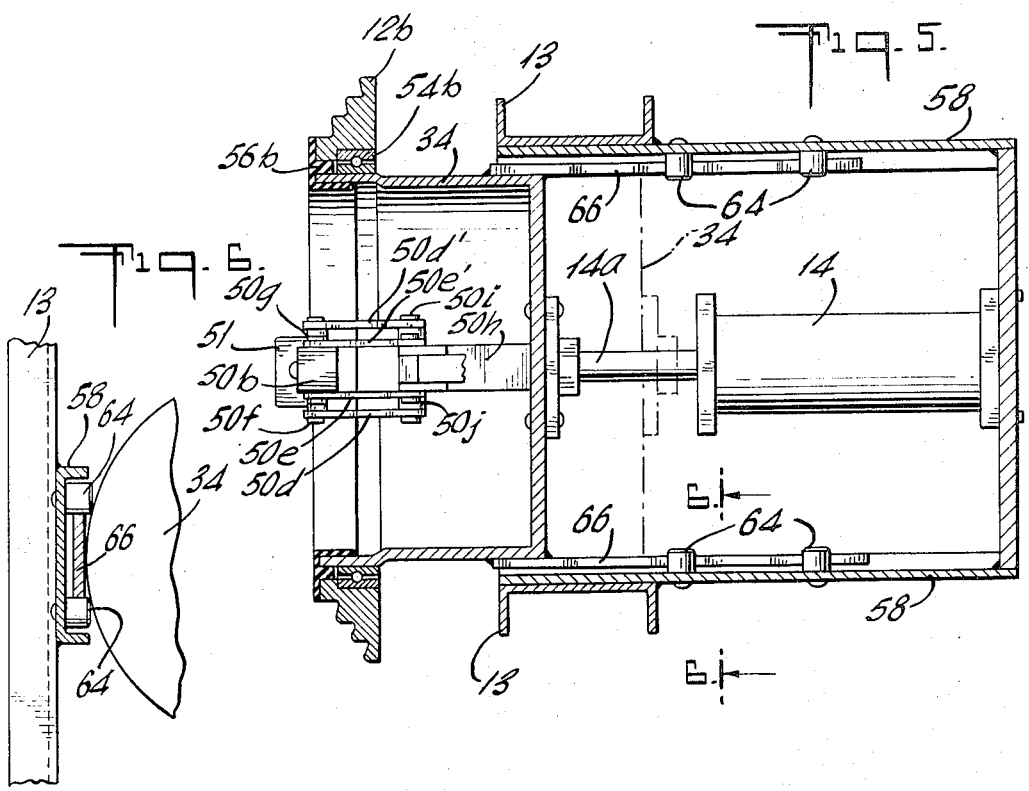
Fig. 5.
Fig. 6.

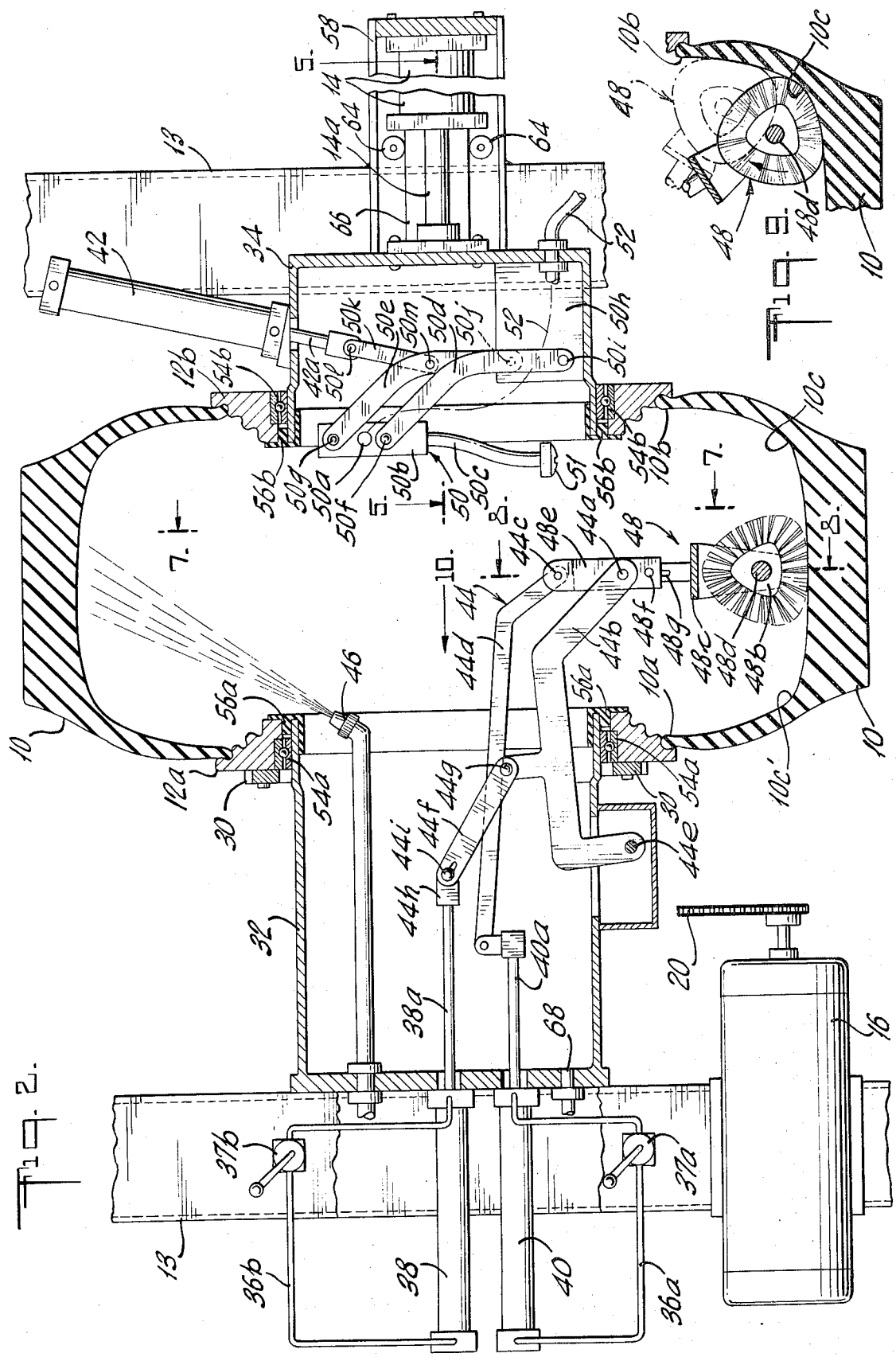

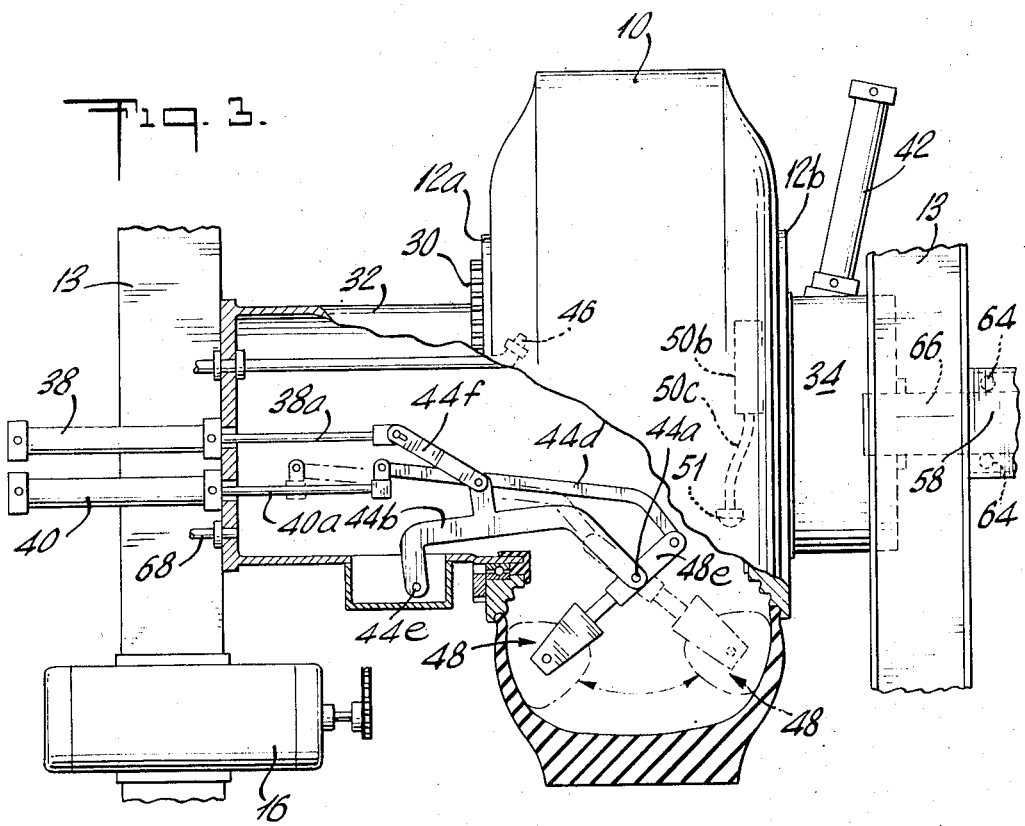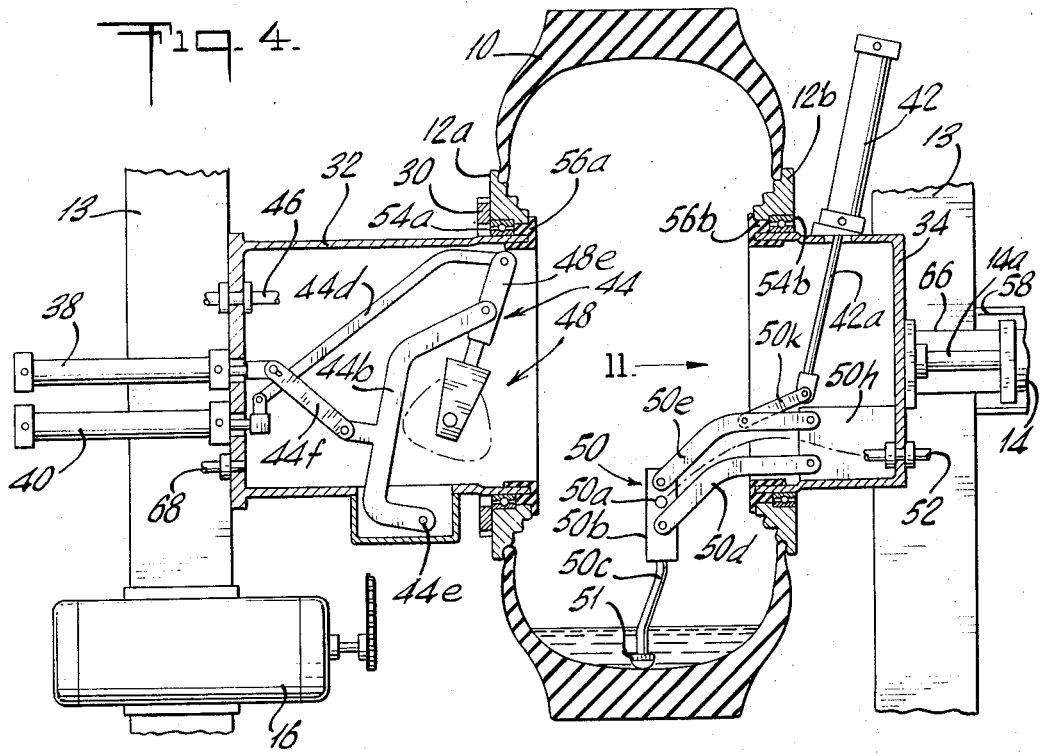

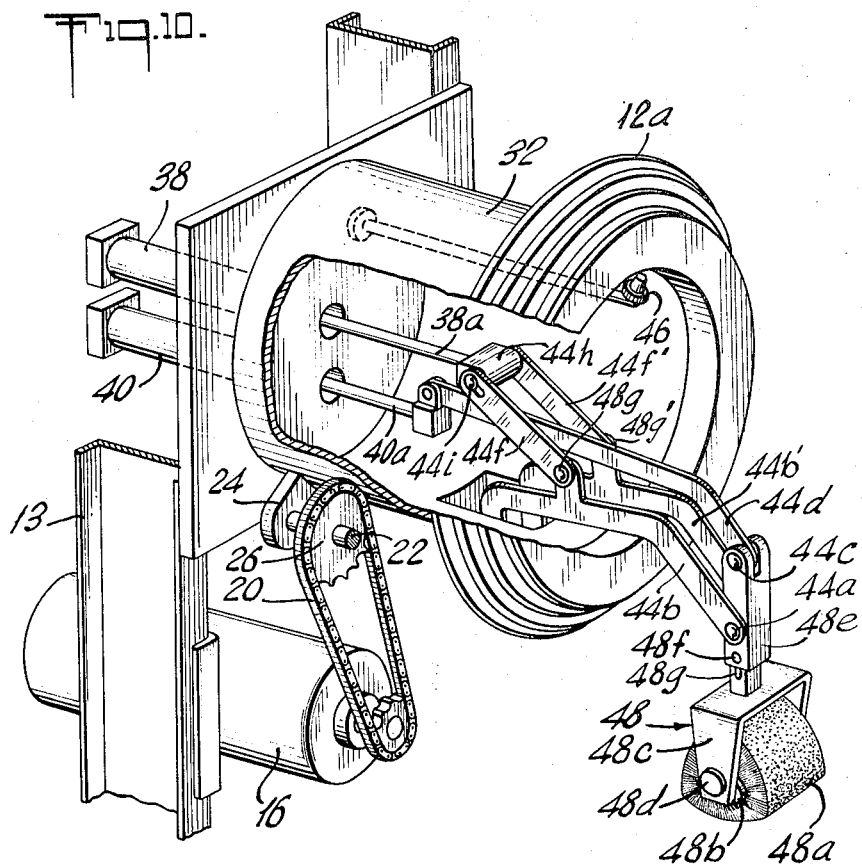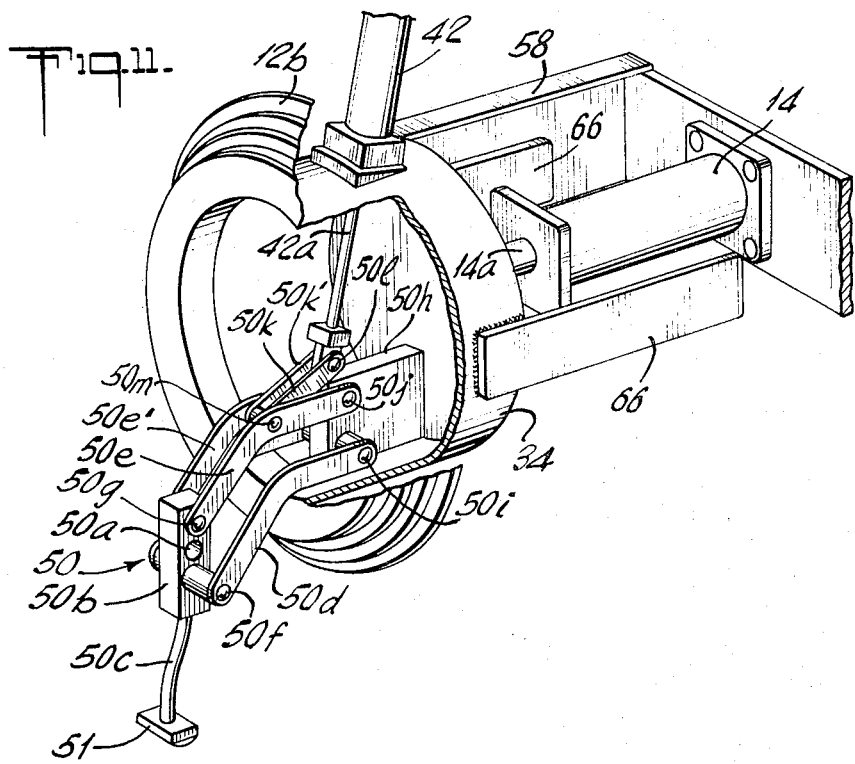

APPARATUS FOR CLEANING TIRE INNER-LINERS

BACKGROUND OF THE INVENTION

CROSS REFERENCE TO RELATED APPLICATIONS

This application is related to U.S. Ser. No. 137,942, now U.S. Pat. No. 3,769,122 which is a C.I.P. of U.S. Ser. No. 859,241, now abandoned, which in turn is a C.I.P. of U.S. Ser. No. 723,525, now abandoned, all of which are commonly assigned with this application.

PRIOR ART

The liquid rubber based coating which is the subject of the related applications may be applied to the inner surface of tire casings to increase their resistance to penetration by air and thereby minimizing premature failures. In order for such a liquid to be effective it must stay in place in spite of the continual flexing of the continual flexing of the tire in service and the heat buildup which occurs. It has been found that proper cleaning of the inner surface of the tire is critical to the successful application of the liquid air barrier material. Mold release compounds which are used during the original fabrication of the tire remain on the interior of the tire casing, preventing satisfactory adhesion and leading to peeling of the coating.

Removal of the contamination by sand blasting gives quite satisfactory results, but the practical difficulties in the technique make it unattractive compared to another method, mechanical abrasion by wire brushing. Manual wire brushing is insufficient and does not always prepare the surface adequately, even if the wire brush is motor driven. An especially designed apparatus intended to provide a suitable wire brushing of the interior of the tire is disclosed in U.S. Ser. No. 267,647, also assigned to the assignee of the present application. While the performance of a machine disclosed in the earlier application was quite satisfactory, it has several deficiencies. Its cost is relatively high, its use requires a considerable amount of skilled labor and it is difficult to automate. Also, without proper attention of the operator the tire casing could be insufficiently brushed or, alternatively, overbrushed to the point of damage to the tire casing. Consequently, an improved method has been sought for properly preparing the interior of tire casings for the application of liquid air barrier coating which would be superior to the mechanical brushing previously disclosed.

The present application comprises a novel piece of equipment which provides superior performance and overcomes the deficiencies inherent in the prior art apparatus.

SUMMARY OF THE INVENTION

Apparatus for cleaning the interior of tires is constructed according to the invention to perform the following functions:

1. Clamping and sealing of a tire casing at the bead portion thereof.
2. Inflating of the casing with air.
3. Rotating the tire casing while inflated.
4. Injecting solvent on the interior of the tire while inflated and rotating.
5. Brushing the interior of the tire across its entire circumference from bead to bead, completely removing mold release compounds and other contaminants.
6. Removing solvent after cleaning.
7. Washing the tire interior with clean solvents.
8. Deflating and removing the tire for subsequent drying and application of the liquid air barrier coating.

The foregoing functions are accomplished by means of the apparatus which is disclosed in its preferred embodiment hereinafter. Modifications and additions to the preferred embodiment within the scope of the invention are also disclosed.

BRIEF DESCRIPTION OF THE DRAWINGS

FIG. 1 is an elevation view of the apparatus with a tire in the initial position, prior to clamping it in place.

FIG. 2 is a partially cut away and enlarged view of FIG. 1 showing the overall arrangement of the internal mechanisms.

FIG. 3 is another partially cut away view, illustrating the movement of the brush during the cleaning process.

FIG. 4 is a further cut away view illustrating the position of the brush when fully retracted and with the solvent removal system deployed.

FIG. 5 is a view substantially along line 5—5 of FIG. 2.

FIG. 6 is taken substantially along line 6—6 of FIG. 5.

FIG. 9 illustrates the movement of the brush from the tread area to the sidewall of the tire.

FIG. 10 is a perspective view of the brushing mechanism.

FIG. 11 is a perspective view of the solvent removal system.

DESCRIPTION OF THE PREFERRED EMBODIMENT

Figure 7:
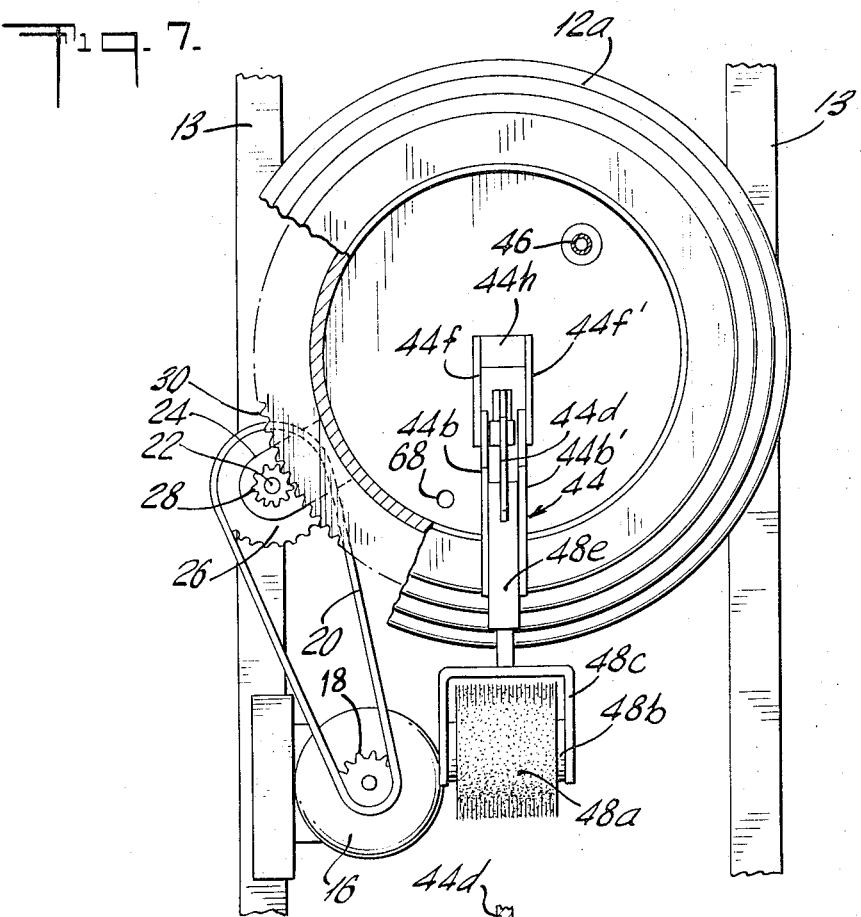
FIG. 7 is a view substantially along line 7—7 of FIG. 2.

In FIG. 1 a tire casing 10 about to be cleaned by the device to be disclosed more completely hereinafter is shown in position between the two rotatable rims 12a and 12b. The rims 12 and other portions of the apparatus of the invention are mounted on a surrounding fixed frame 13 which is shown in part. Actuation of an air operator 14 causes the right hand rim 12b to move laterally to the left until the tire 10 is firmly engaged by both rims 12a and 12b. Thereafter, air is admitted to inflate the tire 10 in a manner to be disclosed hereinafter and the cleaning process is begun. Also illustrated in FIG. 1 are the motor 16 which through a sprocket 18 and chain 20 drives a shaft 22 mounted between sleeve bearings 24a and 24b which carries an additional sprocket 26 around which the chain 20 passes. At one end of this shaft is mounted a pinion gear 29 which engages a mating ring gear 30 on left rotatable rim 12a. By this means, the rotatable rim 12a may be turned independently of the cylindrical housing 32 on which it is mounted. The right rotatable rim 12b is free to move about its corresponding housing 34 so that, when the left hand rim 12a is turned, the tire 10 and the right hand rim 12b are also rotated. The motor 16 may be electrically reversible making it possible to rotate a tire mounted between the rims 12 in two directions. Air lines 36 which supply air cylinders 38 and 40 shown in FIG. 1 are controlled by admitting air by manually operated valves 37a and 37b. These air cylinders 38 and 40 operate the brushing mechanism which will be shown and described more completely hereinafter. An additional air cylinder 42 which operates the extraction nozzle 51 is also shown.

The operation of the apparatus may be described with reference to FIG. 2 as follows: Once the tire 10 has been inflated and sealed against the rotating rims 12a and 12b as discussed above, the brushing mechanism shown generally as 44 may be moved from a retracted position within the cylindrical housing 32 and into operating position within the tire 10. The brush is shown here at the midpoint of its travel but, as discussed later, the brush traverses the entire interior surface of the tire 10. Solvent is injected into the tire through nozzle 46 in order to assist in the cleaning process. The tire 10 is rotated by means of the motor driven system previously described, which rotates the rims 12a and 12b independently of the cylindrical housings 32 and 34. The brushing action of mechanism 44 (described in detail in connection with FIG. 10) assists the solvent in cleaning the tire interior, the brush 48 traversing from bead 10a to bead 10b, thoroughly contacting all areas of the interior of the tire casing 10. The rotational speed may be varied, but about 50 rpm is suitable. The brushing process continues for a period of about one minute until the cleaning is completed. At that time the motor 16 is shut off and rotation stops. The air cylinder 40 is operated first to bring the brush 48 against bead 10a and then air cylinder 38 is actuated to retract the brushing mechanism 44. Once the brushing mechanism is fully retracted, air cylinder 42 is actuated to lower the extraction mechanism shown generally as 50 (described in detail in connection with FIG. 11) into the lower portion of the tire. Since the tire is inflated with air to approximately 10 psig, the solvent may be expelled simply through the extraction nozzle 51 and exterior hose 52 into a disposal and/or recovery system (not shown). Following extraction of the solvent, which will be contaminated by the material removed from the interior of the tire, fresh solvent is injected through nozzle 46 in order to wash down residual contamination. This material is also removed from the tire by the extraction nozzle 51. Once the cleaning process has been completed and the solvent removed, the extraction nozzle 51 is retracted into housing 34 by air cylinder 42. The tire is then depressured through the solvent removal system 50. The cylindrical housing 34 is moved away from the tire casing 10 and the casing removed. After drying, application of a liquid air barrier coating can be made.

Both of the rotatable rims 12a and 12b are mounted upon the stationary cylindrical housings 32 and 34 by means of a cylindrical ball bearing race 54a and 54b mounted upon the housings 32 and 34. The rims 12a and 12b each have multiple flanges intended for use with various size tires. The rims 12 are sealed against the loss of air pressure by means of flexible seals 56a and 56b. The cylindrical housing 32 is stationary while the cylindrical housing 34 is movable laterally by air cylinder 14 mounted on a frame 58, which is in turn attached to the overall mounting frame 13 for the apparatus. Support guides 60 are provided in order to avoid placing all of the stress upon the air cylinder 14 itself through its operating shaft 14a.

As illustrated in FIG. 3, the brush 48 is capable of traversing completely across the circumference of the tire 10 from bead 10a to bead 10b. The brush 48 is moved about a pivot 62 stationed on the vertical axis of the tire carcass. Movement of the brush occurs by a reciprocating action of the air cylinder 40 as illustrated by solid and dashed lines in the drawing.

FIG. 4 illustrates the solvent removal step in the cleaning process wherein entire brushing mechanism 44 has been fully retracted into the stationary cylindrical housing 32. Once the tire 10 has stopped rotation, the solvent remaining therein collects at the bottom of the casing 10 and by actuation of the air cylinder 42 the extraction mechanism 50 is moved downward into position at the bottom of the tire. The air pressure within the tire casing 10 is sufficient to force solvent out through the extraction nozzle 51 and the flexible hose connection 52 to an external system (not shown) for recovery of the solvent used. As previously mentioned, thereafter it is possible to spray additional solvent into the tire to wash down the residual contamination and this second solvent wash can be extracted in the same fashion as the first contaminated wash.

FIG. 5 shows in a plan view an enlarged detail of rotatable rim 12b and its operation by air cylinder 14. The rim 12b is mounted on a ball bearing race 54b so that it may move freely in relation to the cylindrical housing 34. Seal 56b is provided to prevent air leakage from the interior of the tire while inflated. The cylindrical housing 34 is moved laterally by air cylinder 14 so that rims 12 can engage a tire casing placed between them. The air cylinder 14 is directly mounted on sub frame 58 which is rigidly attached to the main frame 13. Guides 64, attached to sub frame 58 support housing 34 through slides 66 attached thereto.

FIG. 6, which shows a sectional view of a portion of FIG. 5, illustrating the supporting members which guide and support the cylindrical housing 34 during its lateral movement and prevent distortion of the shaft 14a of the air cylinder 14.

FIG. 7 illustrates in an end view the mechanism 44 which extends the brush into the tire so that it contacts the interior of the tire casing. When viewed in conjunction with FIGS. 3, 4, and 10, the operation of the mechanism will be clearly understood. Also shown is another view of the drive mechanism by which the motor 16 rotates by means of a ring gear 30 and pinion gear 28, the rotatable rim 12a. In addition the spray nozzle 46 for solvent inlet and the air pressure inlet 68 are illustrated.

Figure 8:
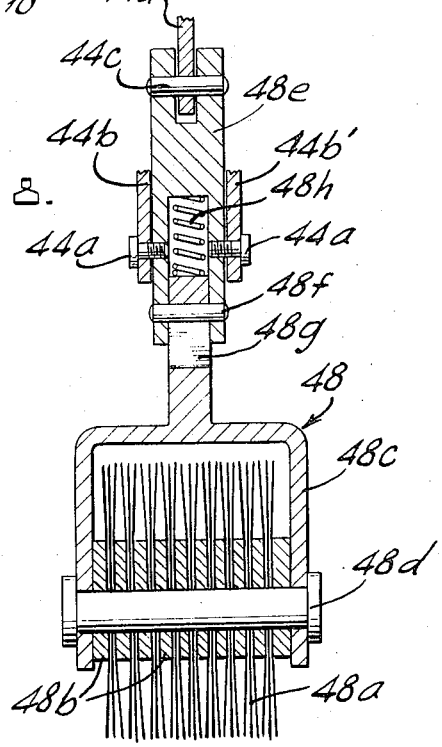
FIG. 8 is a sectional view of the brush in its mounting.

The brush of FIG. 7 is shown in an enlarged view in FIG. 8 wherein it is to be noted that the brush 48 is spring mounted in order to assure a reasonable force acting against the tire casing and to accommodate any slight variations in internal circumference of the tire during the rotational period.

Brush 48 comprises a three-sided curved set of bristles 48a secured within a solvent resistant block 48b, the block having an opening through its center so that the block 48b may be held within bracket 48c by pin 48d. The bracket 48c is held in connecting member 48e by pin 48f, which passes through a slot 48g. Spring 48h exerts a downward force against the tire casing when the brush mechanism 44 is extended into the tire casing. Portions of the brush mechanism are shown as connected to the brush 48, namely the pin 44a, connecting the lower extension arms 44b and 44b' and pin 44c, connecting the traversing arm 44d, both to be described more completely in connection with FIG. 10.

FIG. 9 illustrates the movement by which the brush traverses the corner of the tire. As shown by the solid lines, the brush which is free to move but is not intentionally rotated will ordinarily turn 120° in order to traverse the corner 10c. The overall motion of the brush is toward the bead area 10b. As it meets resistance at the corner 10c, the brush turns about pin 48d in order to more easily negotiate the corner. It is to be noted that the brush 48a has three curved sides with rounded corners, shaped to most nearly suit the curvature which is established by an inflated tire. When the brush makes its return movement toward the opposite bead, another reversal of the brush will ordinarily occur at the corner 10c followed by an additional turn at the opposite corner (not shown).

FIG. 10 shows a perspective view most clearly illustrating the construction of the brushing mechanism 44.

The brushing mechanism is attached to the brush 48 and consists of two main parts, the extension arms and the traversing arms. The brush is extended or retracted by lower extension arms 44b and 44b', connected to the brush connecting member 48c by pins 44a. The lower extension arms 44b and 44b' are pivoted about a pin 44e, hidden in this view but shown in FIG. 2. The lower arms are rotated about pin 44e by lateral movement of air cylinder shaft 38a, acting through upper extension arms 44f and 44f', secured to lower arms 44b and 44b' by pins 44g and 44g' (the latter obscured in this view). The connection between upper arms 44f and 44f' and shaft 38a is made by yoke 44h and secured by pin 44i. A slot is provided in upper arms 44f and 44f' to allow the brush mechanism 44 to adjust to different tire casing sizes. The brush mechanism is shown extended in FIG. 10. If shaft 38a is moved back by cylinder 38, the brush and its mechanism will be retracted into housing 32, pivoting about pin 44e. Note that shaft 40a must be fully retracted before the shaft 38a is retracted. The traversing movement of brush 48 is provided by a lateral movement of shaft 40a, operated by air cylinder 40, acting through traversing arm 44d to cause the brush to oscillate about pin 44a, as shown in FIG. 3.

FIG. 11 shows a perspective view of the solvent removal mechanism. The solvent removal mechanism, generally shown as 50, consists of the nozzle 51 which is lowered into the tire casing so that solvent may be expelled by air pressure through a hose connected to outlet 50a. The nozzle 51 connects through tube 50c and a passageway through connecting member 50b to outlet 50a. The nozzle assembly just described, is raised and lowered by the lower extension arms 50d and 50d' (the latter obscured in this view) and upper extension arms 50e and e', the lower arms connected to member 50b by pin 50f and the upper arms by pin 50g. The arms are connected to supporting block 50h which is rigidly fastened by pins 50i and 50j to housing 34. The arms pivot about pins 50i and 50j as determined by the movement of shaft 42a, actuated by air cylinder 42. The shaft 42a is connected to operating arms 50h and 50i by pin 50l, the arms 50k and k' in turn are connected to upper arms 50e and 50e' by pin 50m. The nozzle 51 is shown in its lower position. By actuating cylinder 42 shaft 42a will be retracted causing the nozzle to be raised as the extension arms 50d and 50d' and 50e and 50e' are pivoted about the pins 50i and 50j.

The foregoing description of the preferred embodiments is illustrative of the invention but should not be taken to limit the scope thereof which is defined by the claims which follow.

What is claimed is:

1. A tire interior cleaning apparatus comprising:
   a. rim means for clamping and sealing said tire at its bead area thereby isolating the interior of said tire for inflation thereof;
   b. means for inflating said tire;
   c. means for rotating said rim means;
   d. solvent injection means for introducing solvent into said tire; and
   e. brush means for brushing the interior of said tire while said tire is rotating.

2. The apparatus of claim 1 further comprising
   f. solvent removal means adapted for extracting solvent from said tire interior subsequent to the completion of the brushing operation.

3. The apparatus of claim 2 wherein said solvent removal means comprises means for reclaiming said solvent after removal from said tire.

4. The apparatus of claim 1 wherein said rim means comprises a pair of circular rims adapted to seat against the beads of said tire, each of said rims rotatably mounted on a non-rotatable cylindrical housing, one of said housings being fixed in position and the other of said housings being movable along the axis of rotation of said tire.

5. The apparatus of claim 1 wherein said means for rotating said rims comprises a ring gear fixed concentrically to said rim and a pinion gear in operable engagement with said ring gear and mounted on a rotatably driven shaft mounted on the fixed one of said housings.

6. The apparatus of claim 1 wherein said brush means comprises a plurality of bristles contoured to the interior surface of the inflated tire and mounted for free oscillation about a central pivot on a supporting frame member, said brush means being extendably mounted within the fixed one of said cylindrical housings whereby said brush may be fully retracted within said housing or extended from said housing into contact with the interior surface of said tire, so that when the brush is in its extended position it oscillates in contact with said interior surface from bead to bead.

7. The apparatus of claim 6 wherein said brush means is extended and retracted by a first plurality of lever arms fixed at one end to a first air cylinder operator means and at the other end pivotally attached to said frame member, said level arms being pivoted between said first air cylinder and said brush about a pivot mounted on said fixed cylindrical housing.

8. The apparatus of claim 7 wherein said brush means is oscillated by a second plurality of lever arms attached at one end to second air cylinder operator means and at the other end to said brush means at a point spaced from said bristles so as to permit oscillation of said brush means about the pivotal attachment to said first lever arms.

9. The apparatus of claim 2 wherein said solvent removal means comprises an extraction nozzle containing a passageway for said solvent extendably mounted within the movable one of said cylindrical housings, whereby said nozzle may be fully retracted within said housing or extended outside of said housing into close proximity with the interior surface of said tire to facilitate removal of the solvent from said tire.

10. The apparatus of claim 9 wherein said extraction nozzle is connected by lever arms to an air cylinder operator mounted on said movable housing, whereby said nozzle may be extended out of said housing into said tire or retracted within said housing.

* * * * *